United States Patent [19]

Ozaki et al.

[11] Patent Number: 5,789,111
[45] Date of Patent: Aug. 4, 1998

[54] NON-AQUEOUS ELECTROLYTE SECONDARY CELL AND METHOD OF MANUFACTURING SAME

[75] Inventors: Yoshiyuki Ozaki; Hizuru Koshina, both of Neyagawa, Japan

[73] Assignee: Matsushita Electric Industrial Co., Ltd., Osaka, Japan

[21] Appl. No.: 597,963

[22] Filed: Feb. 7, 1996

Related U.S. Application Data

[62] Division of Ser. No. 386,635, Feb. 10, 1995, Pat. No. 5,522,127.

[30] Foreign Application Priority Data

Feb. 10, 1994 [JP] Japan ................... 6-016338

[51] Int. Cl.⁶ ......................................... H01M 4/58
[52] U.S. Cl. ........................ 429/218; 429/194; 423/448; 423/460; 252/502; 252/510; 264/105
[58] Field of Search ........................... 429/218, 194; 423/448, 460; 252/502, 510; 264/105

[56] References Cited

U.S. PATENT DOCUMENTS

| | | | |
|---|---|---|---|
| 4,161,063 | 7/1979 | Goebel et al. | 429/94 |
| 4,883,617 | 11/1989 | Benn et al. | 264/29.1 |
| 5,093,216 | 3/1992 | Azuma et al. | 429/218 |
| 5,344,724 | 9/1994 | Ozaki et al. | 29/623.5 |
| 5,401,598 | 3/1995 | Miyabayashi et al. | 429/218 |

FOREIGN PATENT DOCUMENTS 1-290559  11/1989  Japan.

*Primary Examiner*—Bruce F. Bell
*Attorney, Agent, or Firm*—Ratner & Prestia

[57] ABSTRACT

A non-aqueous electrolyte secondary cell having high charging efficiency over a wide temperature range, including low temperature, high energy density and superior charge and discharge cycle life, provided with a negative electrode manufactured with mesophase graphite particles obtained by a process to carbonize and then fully graphitize with a pulverizing process added before or after the carbonization.

17 Claims, 1 Drawing Sheet

NON-AQUEOUS ELECTROLYTE SECONDARY CELL AND METHOD OF MANUFACTURING SAME

This application is a division of application Ser. No. 08/386,635, filed Feb. 10, 1995, now U.S. Pat. No. 5,522,127.

BACKGROUND OF THE INVENTION

1. Field of the Invention

This invention relates to a non-aqueous electrolyte secondary cell and a method of manufacturing the same, the cell having a negative electrode of carbon material to which intercalation by charging and deintercalation by discharging of lithium are possible.

2. Description of the Prior Art

In recent years, electronic appliances have become more and more portable or cordless. In such circumstances, demand for the development of secondary cells which are smaller, lighter and of higher energy density by manufacturers of such appliances are increasing.

Non-aqueous secondary cells with negative electrodes of metallic lithium or lithium alloy can produce high voltages and high energy densities and, hence, research and development of these various types of battery systems have been active. However, it was found that discharging capacity decreases as charging and discharging are repeated in cells with negative electrodes made of metallic lithium which seems to be capable of producing the highest voltages and highest energy densities.

The decreasing discharging capacity is likely due to internal short circuiting of the cell by dendritic metallic lithium deposited on the negative electrode or side reactions of the decomposition of the organic solvent in the non-aqueous electrolyte. Also, such cells were insufficient in high-rate charging and discharging characteristics and in over-discharging durability, and the application in other fields was considered difficult. Further, suspicions of poor safety of cells having negative electrodes produced of metallic lithium or lithium alloy were big obstacles for putting them to practical use.

Thus, instead of negative electrodes of metallic lithium or lithium alloy, a new type of negative electrode material has been discovered which utilizes intercalation and deintercalation reaction of lithium by charging and discharging.

Among them, using carbon material as the negative electrode has been produced. Carbon material has nearly the same characteristic as metallic-lithium used in negative-electrode. For example, see U.S. Pat. No. 4,423,125. And, it has been reported in research that carbon materials are capable of intercalating or deintercalating more lithium by charging and discharging thereby obtaining negative electrodes of higher capacity.

Of the reports, two main themes are seen: one argues that highly graphitized carbon materials, such as natural graphite or artificial graphite are suitable; the other reports pseudographite materials such as those is obtained by carbonization of hydrocarbons or polymer materials at temperatures as low as 1000° to 1500° C. are suitable.

In both cases, various points have been discussed, e.g., the effects of using different kinds of precursor carbon, the methods and condition of carbonization and graphitization. Interplanar spacing values of (002) plane or crystal thickness along the c axis or a axis obtained by X-ray powder diffraction for carbon materials have been reported.

It has been known that the quantity of lithium in the intercalation compound which has been formed by intercalation between layers of graphite is at a maximum when has the form of $C_6Li$. The specific capacity of graphite at this case being 372 mAh/g.

However, a pseudographite material with low graphitization has a low quantity of intercalated lithium, so that the specific capacity is as low as 200 mAh/g, limiting the capacity of the cell.

In order to solve the above problems and to obtain high capacity, a method has been proposed and described in U.S. Pat. No. 5,344,724 by some of the inventors of the present invention. According to that method, pitch is melted to produce mesophase carbon micro beads, which are the intermediate products between liquid phase and solid phase. the beads are then carbonized and then graphitized to become mesophase graphite and are then used as the negative electrode material. By using mesophase graphite particle for the negative electrode, the quantity of intercalated lithium is increased, resulting in the increased specific capacity of the negative electrode. However, when negative electrodes are prepared by coating core foils of copper or stainless steel (which are to become collectors) on both the surfaces with paste composed of the mesophase graphite particles and a binder; drying the electrodes; pressing the electrodes by a roller, and simultaneously fabricating cells, the cells were found to have the quantity of lithium intercalated in the mesophase graphite particles greatly reduced when they are charged at temperatures below 0° C., compared with at ordinary temperatures. The lithium which was not intercalated was deposited on the negative electrode surface in a metallic dendritic form. The metallic lithium, once deposited as dendrite, is not extinguished when the charging and discharging are repeated, resulting in no contribution to the main reaction, and a decrease in the cell capacity. Such cells do not recover discharge capacity if they are then put into ordinary temperatures. Furthermore, these cells short circuit internally due to the metallic dendritic lithium and have a short charging and discharging cycle life. Such deposition of metallic lithium and decrease of cell capacity are not observed if the charge and discharge cycle are performed at ordinary temperatures.

The above described deterioration by charging is and discharging at a low temperatures likely results from the basal plane of the graphite crystal becoming parallel to the core foil surface due to high orientation characteristics of the mesophase graphite. It has been found that at the surface perpendicular to the basal plane of the graphite crystal lithium is easily intercalated, whereas, in the above described negative electrode, the planes to which lithium is to be intercalated are arranged almost perpendicular to the negative electrode surface. This leads to the checking of lithium easily intercalated between the graphite layers during charging.

SUMMARY OF THE INVENTION

An object of the present invention is to provide non-aqueous electrolyte secondary cells of high energy-density with negative electrodes of carbon material to which lithium is intercalated and deintercalated by charging and discharging. The secondary cells provide long charging and discharging cycle lives and superior recoverability capacities by preventing the deposition of dendritic metallic lithium. The deposition of metallic lithium causes the capacity loss of cells when charged at low temperatures to suppress internal short circuiting and decreases of discharge capacities.

To attain the above object, a non-aqueous electrolyte secondary cell according to the present invention has a negative electrode made from mesophase graphite particles. The mesophase graphite particles are produced by starting with micro beads of mesophase carbon made from pitch (coal-tar pitch, petroleum pitch etc.) and either pulverizing them to fine particles first and then by carbonizing and graphitizing, or carbonizing them first and then pulverizing and graphitizing.

According to the present invention, the negative electrode is formed by pressing the mesophase graphite particles which were obtained by adding a pulverizing process before or after carbonizing a core foil, the orientations of the carbon crystals are distributed randomly. This leads to smooth intercalating of lithium at charging over a wide temperature range resulting in an increased cell capacity.

DETAILED EXPLANATION OF THE INVENTION

Figure 1:
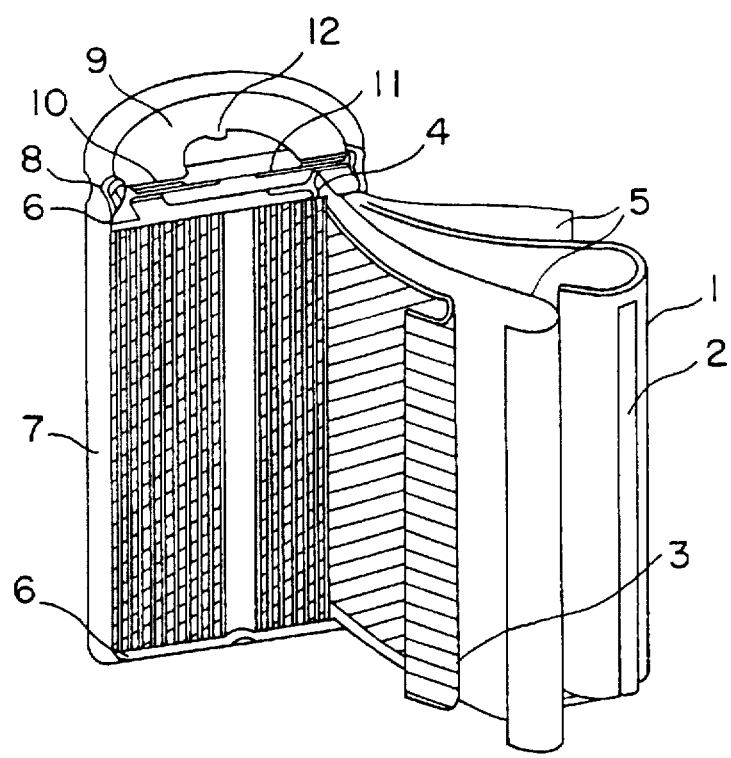
FIG. 1 shows a cross-section and broken perspective view of non-aqueous electrolyte cylindrical secondary cell according to the present invention.

Referring to the drawings, an exemplary example of the present invention is explained as follows.

(1) Preparation of mesophase carbon micro beads

Pitch (coal-tar, or petroleum pitch) was heated and melted; mesophase carbon micro beads were separated on a centrifuge from the pitch matrix, and classified according to particle size.

(2) Preparation of mesophase graphite particles

A) Mesophase carbon micro beads of 20 μm average diameter were pulverized by a jet mill to smaller particles of 5.7 μm average diameter; the pulverized beads were then carbonized at 1000° C. and further graphitized at 2800° C. to obtain mesophase graphite particles A, which had 5.7 μm average diameter and their specific surface area was 3.2 $m^2/g$.

B) Mesophase carbon micro beads of 20 μm average diameter (the same as that in A) were first carbonized at 1000° C., and then pulverized on a jet mill to 5.8 μm average diameter; the pulverized beads were further graphitized at 2800° C. to obtain mesophase graphite particles B having 5.8 μm average diameter and specific surface area 3.4 of $m^2/g$.

C) Mesophase carbon micro beads of 20 μm average diameter (same as that in A) were carbonized at 1000° C., and then graphitized at 2800° C.; the graphitized beads were then pulverized by a jet mill to 6.0 μm average diameter to obtain mesophase graphite particles C for comparison having specific surface area of 12.5 $m^2/g$.

D) Mesophase carbon micro beads of 30 μm average diameter were pulverized to 12 μm average diameter, and then carbonized and graphitized at the same temperatures as above to obtain comparison mesophase graphite particles D.

E) Mesophase carbon particles of 5.7 μm average diameter were directly carbonized and graphitized at the temperature as above in A using a conventional method, to obtain mesophase graphite particles E of 5.7 μm average diameter and 3.0 $m^2/g$ specific surface area.

F) According to a conventional method, mesophase carbon particles of 20 μm average diameter were pulverized to 5.7 μm average diameter; carbonized at 1000° C. and graphitized at 2300° C., (which is lower than that in A), to obtain mesophase graphite particles E, which represents another example in the prior art corresponding to pseudographite.

(3) Fabrication of the negative electrode plate

A hundred weight part of each of the mesophase graphite particles obtained as above was mixed with 5 parts by weight stylene butadiene rubber, and then after the addition of carboxymethyl cellulose (CMC) aqueous solution, mixed to obtain a paste. A copper foil of 0.02 mm thickness was coated with this paste on both surfaces, and, after drying, the foil covered with paste was pressed by a roller to 0.20 mm thickness. A negative electrode plate 39 mm wide and 260 mm long was cut from the rolled foil.

(4) Fabrication of positive electrode plate

A hundred weight part of lithium cobaltate ($LiCoO_2$) powder, 3 parts by weight of acetylene black as an electroconductive agent, and 7 parts by weight of poly-tetrafluoro ethylene as a binder were mixed together. CMC aqueous solution was then added, to obtain a paste. Aluminum foil of 0.03 mm thickness was coated on both sides with this paste; dried and pressed by a roller to 0.18 mm thickness. A positive electrode plate 37 mm wide and 240 mm long was cut from the rolled foil.

(5) Fabrication of experimental cells

The positive and negative electrode plates were each provided with a lead plate. A separator formed of microporous polyethylene membrane 0.025 mm thick, 45 mm wide and 730 mm long was sandwiched between these electrode plates. The positive and negative electrode plates and the separator were wound together to form an electrode plate group. The electrode plate group was placed in a cell case, to which a non-aqueous electrolyte was poured. By sealing, a AA size cell was fabricated. FIG. 1 shows a detailed broken perspective view of the non-aqueous electrolyte secondary battery, in which numeral 1 is a negative electrode plate with a lead plate 2, and numeral 3 is a positive electrode plate with a lead plate 4. An electrode plate group formed by the negative electrode plate 1 and positive electrode plate 3 wound together with a separator 5 in between is placed in a cell case 7 with insulators 6 thereon and thereuder. The cell case 7 works as the negative terminal. The cell case 7 is sealed at the upper flange with a cover 9 with a gasket 8 in between. The cover 9 comprises a positive temperature coefficient thermister (PTC) device 10 to prevent over current through outer short circuiting with, for example, a safety valve 11 and exhaust hole 12. The negative electrode lead plate 2 and positive electrode lead plate 4 are connected with the inside bottom of the cell case 7 and the cover 9, respectively. The non-aqueous electrolyte used was an organic electrolyte prepared by dissolving $LiPF_6$ (1 mol/l) in a mixed solvent of ethylene carbonate, diethyl carbonate and methyl propionate in a 3:5:2 volume ratio.

(6) Charging and discharging test

The cells prepared as above and designated A, B, C, D, and E according to the designation of mesophase graphite particles of the negative electrodes which were tested for charging and discharging performance The test conditions were; charging was carried out for two hours, initially with 350 mA constant current, and, once the set voltage 4.1 V was obtained, the voltage was kept constant and the discharging was continued with constant current of 500 mA until an end voltage of 3.0 V was reached. The charging and discharging were repeated for 20 cycles under the above condition and at 20° C., and then, after keeping the cell for 6 hours at a temperature of 0° C., 20 cycles of charging and discharging were applied. Then, after the last discharging, the environmental temperature of the cell was returned to 20° C., and after 6 hours of keeping, the cell at a temperature of 20° C. 50 charging and discharging cycles were repeated.

In the course of testing, Initial capacity, 0° C. capacity, Recovery capacity, and Last capacity were measured; wherein "Initial capacity" means the discharge capacity at the 10th cycle in the charging and discharging cycles at 20° C., "0° C. capacity" means the discharge capacity at the third cycle in the charging and discharging cycles at 0° C., "Recovery capacity" means the discharge capacity at the third cycle in the charging and discharging cycles after returning to 20° C., and "Last capacity" means the discharge capacity at the fiftieth discharge after the returning to 20° C.

Based on these measurements, 0° C.—capacity retention ratio and Capacity Recovery ratio were calculated by the following formulae:

$$0° \text{ C.-Capacity Retention Ratio (\%)} = \frac{0° \text{ C.-capacity}}{\text{Initial capacity}} \times 100$$

$$\text{Capacity Recovery Ratio (\%)} = \frac{\text{Recovery capacity}}{\text{Initial capacity}} \times 100$$

The results are shown in the Table.

TABLE I

| Cells | Initial capacity (mAh) | 0° C. capacity retention ratio (%) | Capacity recovery ratio (%) | Last capacity (mAh) |
|---|---|---|---|---|
| A (Invented) | 520 | 76.2 | 100.0 | 519 |
| B (Invented) | 523 | 75.2 | 100.0 | 521 |
| C (Comparison) | 435 | 62.0 | 92.0 | 358 |
| D (Comparison) | 510 | 72.3 | 98.7 | 397 |
| E (Prior art) | 524 | 56.5 | 88.5 | 412 |
| F (Comparison) | 488 | 76.8 | 100.0 | 431 |

In Table I, it is observed that cells A and B according to the present invention have the high capacities, superior 0° C.—capacity retention ratios, 100% capacity recovery ratios, and the Last capacities not significantly different from the Initial capacities, so that deterioration of capacities by the charging and discharging cycle was not recognized. The cells were dismantled after the charge and discharge test and the negative electrodes were observed to find any significant changes of shape or deposition of dendritic metallic lithium.

The cell C, for comparison, (having mesophase graphite particles in the negative electrode prepared by pulverizing after graphitization so as to have the same average size as that in A and B) had an Initial capacity as low as 435 mAh. Also, cell C had a low 0° C.—capacity retention ratio, capacity recovery ratio and Last capacity. After the charge and discharge test a little amount of deposited dendritic metallic lithium was observed on the negative electrode. It is presumed that the large specific surface area of the mesophase graphite particles for cell C lead to a side reaction which decomposes the organic solvent in the non-aqueous electrolyte and further decreases the capacity.

As for the cell D, for comparison, although it had an Initial capacity, 0° C.—capacity retention ratio and capacity recovery ratio not significantly different from those of invented cells A and B, the Last capacity was low and the deterioration of capacity by the charging and discharging cycle was significant. Observing the negative electrode of the dismantled cell D, there was no deposition of dendritic metallic lithium observer, but, there was dendritic metallic lithium coming-off the negative electrode mix from the core foil. It seems that the mesophase graphite particles of the negative electrode in cell D had 12.5 μm average diameter, which was larger than those of the other cells. This resulted in difficult adherence of the particles onto the foil when fabricated and the particles became smaller in size due to expansion and shrinkage during the charging and discharging cycles which led to capacity deterioration.

The cell E manufactured according to conventional methods had the Initial capacity similar to is those of invented cells A and B, but the 0° C. capacity, retention ratio, capacity recovery ratio and Last capacity were low and the deterioration of the capacity due to the charging and discharging cycles was significant. Almost all over the negative electrode surface of the dismantled cell, deposition of dendritic metallic lithium was observed. This phenomena is thought, as previously described, to be brought about by the significant decrease of the lithium quantity intercalatable into the mesophase graphite particles when charged at a low temperature.

The cell F, also of prior art, had the 0° C.—capacity retention ratio and the recovery ratio both satisfactory and little deterioration of capacity during the charging and discharging cycles, but, the Initial capacity is 30 to 40 mAh lower than those of cells A or B. It is deemed that a graphitization temperature as low as 2300° C. leads to imperfect graphitization which results in little lithium intercalated in the mesophase graphite particles and a low level of the capacity.

One object of the present invention is mesophase graphite particles produced by: carbonizing and graphitizing mesophase carbon micro beads, which were pulverized before or after the carbonization, to fine particles of about 6 μm average diameter and were suitable for pressing by a roller on a core foil. According to many inventor's investigations, favorable mesophase graphite particles were obtained from mesophase micro beads having average particle diameters in the range of 6 to 25 μm, preferably 10 to 20 μm. Also, it was confirmed that favorable mesophase graphite particles could be obtained if the average particle diameter attained by the pulverizing before or after the carbonization was within the range of 3 to 10 μm, preferably 5 to 7 μm. If the average particle diameter is less than 3 μm, an internal short circuiting is apt to happen, which if not prevented by a PTC device, may result in a rapid heating, [and] explosion and/or fire. Average particle diameters over 10 μm, on the other hand, as explained referring to the cell D, cause a capacity decrease due to a coming-off of the negative electrode mixture as the charging and discharging cycle proceeds. Furthers the favorable range of the specific surface area of the mesophase graphite particles is 1.0 to 8.0 m$^2$/g, preferably 2.5 to 5.0 m$^2$/g. If the specific surface area is less than 1.0 m$^2$/g, the high-rate discharge characteristic and rapid-charging characteristic are inferior, while, over 8.0 m$^2$/g, as explained previously referring to the cell C, the dendritic metallic lithium and the organic solvent in the non-aqueous electrolyte react to decompose the solvent to reduce the discharge capacity. The temperature for the carbonization of the mesophase carbon micro beads, which was 1000° C. for the above example, is in the range of 800° to 1300° C., preferably 900° to 1100° C. Also, the graphitization temperature, which was 2800° C. in the above explained example, is enough if it is in the range of 2400° to 3000° C., preferably 2600° to 2800° C. to obtain fully graphitized carbon materials.

The present invention is not confined to employing the positive electrode material and electrolyte composition as described in the above examples. As for the positive electrode material, not only LiCoO$_2$ but also LiNO$_2$, LiFeO$_2$, LiMn$_2$O$_4$ and the like can be used, to which lithium can deintercalate and intercalate by charging and discharging.

As for the organic solvent of the organic electrolyte for the non-aqueous electrolyte, propylene carbonate (PC) is not employed, because it decomposes to generate a gas [at] during charging. On the other hand, ethylene carbonate (EC) used alone is not suitable, since it has a high melting temperature and is solid at ordinary temperature, though it has no unfavorable side reaction, as of PC. However, EC may be used in a mixed solvent of and either ether such as 1,2 dimethoxyethane, chain carbonate such as diethyl carbonate, ethyl methyl carbonate, or aliphatic-carboxylic acid ester such as methyl propionate, which are of low melting temperature and of low viscosity.

As described above in detail, the present invention provides a non-aqueous electrolyte secondary cells having a high charging efficiency over a wide temperature range, high energy densities, and superior charge-and-discharge-cycle-lives. The invention is achieved by employing in the negative electrodes mesophase graphite particles obtained by starting from mesophase carbon micro beads, and then either pulverizing and then carbonizing and graphitizing the beads, or carbonizing and then pulverizing and graphitizing the beads.

What is claimed:

1. A non-aqueous electrolyte secondary cell with a negative electrode employing mesophase graphite particles obtained by starting from mesophase carbon micro beads which are one of
   i) pulverized to have an average particle diameter within a defined size range and carbonized, and
   ii) carbonized and pulverized to have a defined average particle diameter forming pulverized and carbonized mesophase graphite particles, wherein said pulverized and carbonized mesophase graphite particles are graphitized.

2. A non-aqueous electrolyte secondary cell according to claim 1, wherein said mesophase graphite particles have an average particle diameter after said preparation in the range of 3 to 10 µm.

3. A non-aqueous electrolyte secondary cell according to claim 1, wherein said mesophase graphite particles have an average particle diameter after said preparation in the range of 5 to 7 µm.

4. A non-aqueous electrolyte secondary cell according to claim 1, wherein said mesophase carbon micro beads have an average diameter before preparation within the range of 6 to 25 µm.

5. A non-aqueous electrolyte secondary cell of claim 1, wherein said mesophase carbon micro beads have an average diameter before preparation within the range of 10 to 20 µm.

6. A non-aqueous electrolyte secondary cell of claim 1, wherein said mesophase graphite particles have a specific surface area in the range of from 1.0 to 8.0 m$^2$/g.

7. A non-aqueous electrolyte secondary cell of claim 1, wherein said mesophase graphite particles have a specific surface area in the range from 2.0 to 5.0 m$^2$/g.

8. A non-aqueous electrolyte secondary cell of claim 1, wherein an orientation of said mesophase graphite particles are randomly distributed in said negative electrode.

9. A non-aqueous electrolyte secondary cell comprising:
   a negative electrode, said negative electrode formed from mesophase graphite particles obtained by starting from mesophase carbon micro beads, and one of
   i) pulverized to have an average particle diameter within a defined size range and carbonized and
   ii) carbonized first and pulverized so as to have an average particle diameter within a defined size range
   forming pulverized and carbonized mesophase graphite particles, wherein said pulverized and carbonized mesophase graphite particles are graphitized,
   a positive electrode, said positive electrode consists mainly of a composite oxide of lithium and at least one metal element selected from the group consisting of cobalt, nickel, iron and manganese,
   a separator, and
   an organic electrolyte.

10. A non-aqueous electrolyte secondary cell according to claim 9, wherein said mesophase graphite particles have an average particle diameter after said preparation in the range of 3 to 10 µm.

11. A non-aqueous electrolyte secondary cell according to claim 9, wherein said mesophase graphite particles have an average particle diameter after said preparation in the range of 5 to 7 µm.

12. A non-aqueous electrolyte secondary cell according to claim 9, wherein said mesophase carbon micro beads have an average diameter before preparation within the range of 6 to 25 µm.

13. A non-aqueous electrolyte secondary cell of claim 9, wherein said mesophase carbon micro beads have an average diameter before preparation within the range of 10 to 20 µm.

14. A non-aqueous electrolyte secondary cell of claim 9, wherein said mesophase graphite particles have a specific surface area in the range of from 1.0 to 8.0 m$^2$/g.

15. A non-aqueous electrolyte secondary cell of claim 9, wherein said mesophase graphite particles have a specific surface area in the range from 2.0 to 5.0 m$^2$/g.

16. A non-aqueous electrolyte secondary cell of claim 9, wherein an orientation of said mesophase graphite particles are randomly distributed in said negative electrode.

17. A non-aqueous electrolyte secondary cell comprising mesophase graphite particles randomly distributed within a negative electrode.

* * * * *